United States Patent [19]

Garrett

[11] Patent Number: 4,845,804
[45] Date of Patent: Jul. 11, 1989

[54] RETRACTABLE CASTER

[75] Inventor: Alan Garrett, Calgary, Canada

[73] Assignee: Underkart Industries of Canada Ltd., Canada

[21] Appl. No.: 58,166

[22] Filed: Jun. 4, 1987

[51] Int. Cl.⁴ .............................................. B60B 33/00
[52] U.S. Cl. ........................................... 16/19; 16/33; 16/34; 280/37; 244/102 R
[58] Field of Search ................. 16/34, 19, 33; 280/37, 280/43.24; 244/102 R, 102 A, 102 SE

[56] References Cited

U.S. PATENT DOCUMENTS

| | | | |
|---|---|---|---|
| 2,423,501 | 7/1947 | Johnson | 244/102 SL |
| 2,552,843 | 5/1951 | Clifton et al. | 244/102 R |
| 2,779,049 | 1/1951 | Hoddevik | 16/34 |
| 4,217,675 | 8/1980 | Haft | 280/37 |
| 4,397,062 | 8/1983 | Huang | 280/37 |
| 4,408,736 | 10/1983 | Kirschbaum et al. | 244/102 A |
| 4,568,045 | 2/1986 | Mayer | 244/102 R |

*Primary Examiner*—Nicholas P. Godici
*Assistant Examiner*—Edward A. Brown
*Attorney, Agent, or Firm*—Kane, Dalsimer, Sullivan, Kurucz, Levy, Eisele and Richard

[57] ABSTRACT

A retractable caster to facilitate moving an object. The caster comprises a frame having a planar base and sides circumscribing the base to form a cavity having an opening. The frame is secured to the bottom of the object. A first rigid flap is provided secured to the frame by a hinge to swing about an axis between open position perpendicular to the base and closed position parallel to but spaced from the base to close at least a portion of the cavity opening. A wheel is rotatably supported by a wheel support assembly secured to the flap. A portion of the wheel extends beyond the lower edge of the flap when in open position. An articulated strut is secured to and extends between a portion of the frame and the wheel support assembly. The strut folds when the wheel is in retracted position so that the wheel, wheel support and strut are fitted within the cavity between the base and the flap in closed position. A lock is provided with the strut for releasably locking the strut in operable position. The strut when locked in operable position rigidly supports the wheel and cover means for load bearing purposes in open position. The retractable caster of the present invention greatly assists in the movement of materials where conventional methods are not available or desirable.

14 Claims, 4 Drawing Sheets

RETRACTABLE CASTER

BACKGROUND OF THE INVENTION

The present invention relates to a caster assembly and more particularly to a retractable caster for difficult-to-manage cases, crates and the like.

There has long been a problem with handling of large or heavy cases, crates and special materials, e.g. up to approximately 1,000 lbs to 1,300 lbs, without the aid of powered assistance, i.e. without forklifts, tow-motors, pallet movers, winches and the like. It may be necessary to handle such cases in conditions where such power tools are unavailable or there is not sufficient space for their use. Even where containers are relatively light, e.g. 150 lbs to 350 lbs, they may be too bulky for manual handling.

Currently, for military applications, air transport aircraft utilize a common roller system on a ramp for freight handling. Various types of containers and cargo are hand-loaded onto pallets, then placed on the rollers of the aircraft's lowered ramp, and winched inside where they are tied down securely. Such cargo may include palletized "battle boxes", medi-cases, ammunition boxes, projectile cases and other standard types of cargo in reusable containers. On the C-130 Hercules aircraft, for example, the roller system weighs approximately 1,700 lbs and takes away from cargo capacity. As well, in the military and in civilian industrial and commercial situations, many types of cargo including engines, transmissions and the like are transported in sealed containers. Until now, such containers have had to be moved by forklift, under ideal conditions, or else manually handled.

While it is known to fit conventional casters to the bottom of heavy objects to facilitate their moving, the usage of such casters has been extremely limited. If the object, such as a cargo container, will be frequently carried on an aircraft, truck, boat or the like, where it will be subjected to irregular and possible sudden motion, such casters have proven unsuitable as they must be removed during transit, or the container firmly tied down. Obviously there is not a problem with such casters on the bottom of heavy furniture which will not be frequently moved.

It is an object of the present invention to provide a type of caster which may, if required, be permanently secured to cases, crates, speciality boxes and the like which are used for transporting bulky or heavy cargo materials. It is a further object of the present invention to provide such a caster which may be fitted ion new containers or the like, or retro-fitted on old ones, and which will instantly facilitate the manual handling, without the aid of powered assistance, of such containers and the like.

SUMMARY OF THE INVENTION

In accordance with the present invention, a retractable caster is provided to facilitate moving an object. The caster comprises a frame having a planar base and sides circumscribing the base to form a cavity having an opening. The frame is secured to the bottom of the object in either recessed fashion or externally. A first rigid flap is secured to the frame by a hinge to swing about an axis between open position perpendicular to the base and closed position parallel to but spaced from the base to close at least a portion of the opening to the cavity. A wheel is rotatably supported by a wheel support assembly secured to the flap. A portion of the wheel extends beyond the lower edge of the flap when in open position. An articulated strut is secured to and extends between a portion of the frame and the wheel support assembly. The strut folds when the wheel is in retracted position so that the wheel, wheel support and strut are fitted within the cavity between the base and the flap in closed position. A lock is provided with the strut for releasably locking the strut in operable position. The strut when locked in operable position rigidly supports the wheel and cover means in open position for load bearing purposes.

In a preferred embodiment of the present invention, a second rigid flap is secured to the frame by a hinge at a location opposite to the first flap to swing about an axis parallel to the axis of the first flap. This second flap is spaced a similar distance from the base as the first flap. The second flap swings in a direction opposite to that in which the first flap swings, respectively between open and closed positions. Confronting edges of the first and second flap when in closed position meet to close the opening to the cavity.

In another preferred embodiment of the caster in accordance with the present invention, the wheel support assembly includes a wheel mount. The wheel is rotatably secured to the wheel mount for rotation about an axle secured to the wheel mount and passing through the wheel. A swivel is secured to the flap and the wheel mount and extends therebetween to permit the wheel to pivot about a vertical axis when the cover means is in open position.

In an alternative preferred embodiment, the wheel mount assembly is rigidly secured to the flap so that the wheel cannot turn, relative to the frame, about a vertical axis.

On a standard square or rectangular shaped container or box or the like, it is preferred that a pair of swivel type casters in accordance with the present invention be placed at the bottom front or rear of the container and a pair of non-pivoting casters be placed at the other of the bottom, front or rear.

It will be immediately appreciated that the retractable caster in accordance with the present invention, when used on the bottom of a container or the like, significantly facilitates manual portability of that container when the wheels are lowered, but enables positioning of the container firmly on the floor when the wheels are in retracted position. Labor savings and forklift cost savings arise by enabling the replacement of aircraft feeder roller systems by using the casters of the present invention.

It will be readily understood that, once the casters are flush mounted on the bottom of a container, crate, box or the like, the casters may be retracted in which case the container, etc. may be handled according to conventional means. Alternatively the casters may be pulled out into open, operable position in which case manual handling of the container or the like is instantly made possible.

By using the retractable caster in accordance with the present invention on containers, warehousing and maintenance centers could benefit tremendously in that quick and easy movement of materiel, tool boxes, reusable heavy part stands, gantries, etc., could be achieved. Indeed, any rigid containers that have to be moved throughout the transporation sphere, either in a military or civilian sense, may be readily fitted with a plurality of retractable casters in accordance with the present invention to facilitate easier and speedier handling thereof, especially where power handling equipment is unavailable or impractical.

BRIEF DESCRIPTION OF THE DRAWING

These and other objects and advantages of the invention will become apparent upon reading the following detailed description and upon referring to the drawings in which.

DETAILED DESCRIPTION OF THE INVENTION

Figure 1:
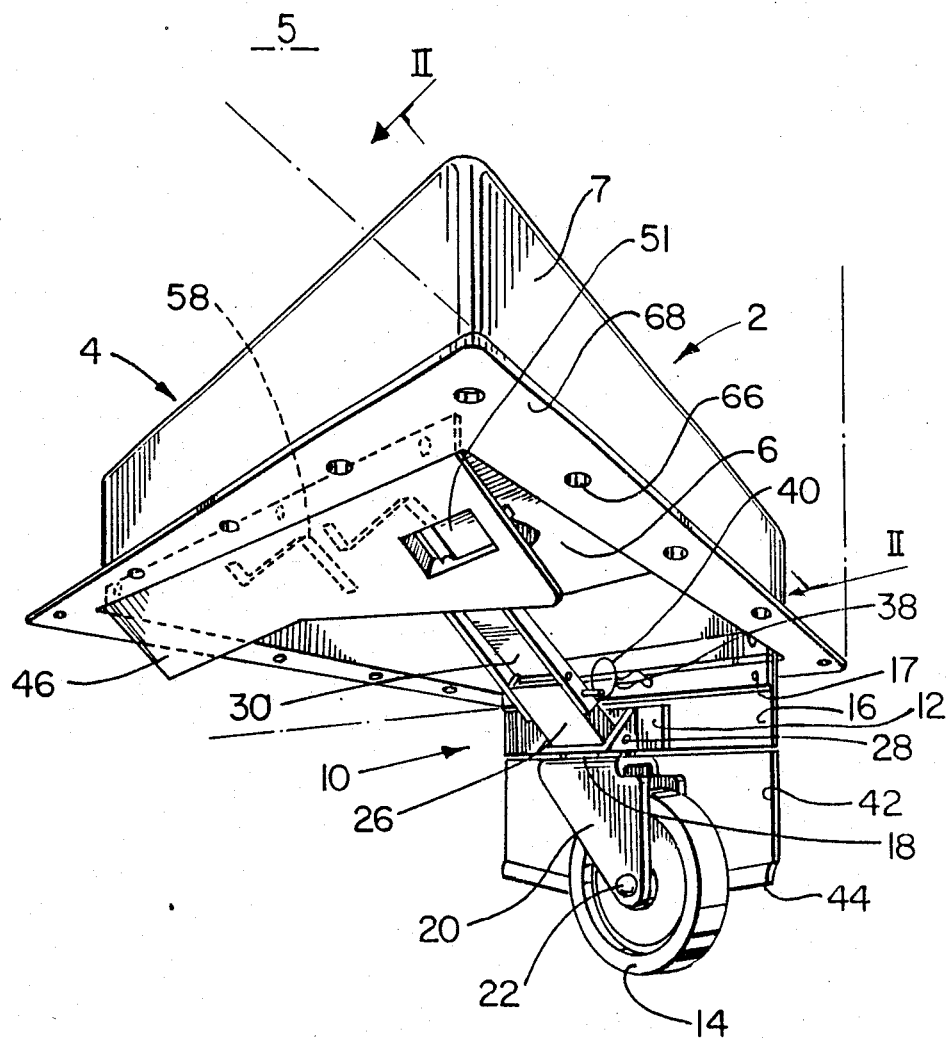
FIG. 1 is a perspective view, from the bottom, of a preferred embodiment of a retractable caster in accordance with the present invention.

In the following description, similar features in the drawings have been given similar reference numerals.

Turning to the drawings, in FIGS. 1 to 4 there is shown a preferred embodiment of a retractable caster 2 in accordance with the present invention. The caster 2 comprises a frame 4 which may be recessed, as illustrated, for example in the bottom corner of a rigid container 5, or, alternatively, externally mounted on the bottom of such a container (not illustrated) using appropriate securing means. The frame is made up of a flat, rectangular base 6 circumscribed by sides 7 normal thereto, the sides and base forming a cavity 8.

An articulated strut member 10 is provided, one end of which is secured to frame 4 and the other end of which is secured to wheel support assembly 12 as illustrated (FIG. 1). To wheel support assembly 12 is secured a caster wheel 14. Secured to wheel support assembly 12 is a flap 16, which flap is secured to the bottom edge of one of sides 7 of frame 4 by means of hinge 17. Hinge 17 is of such a construction that flap 16 is stopped from opening further when it reaches vertical position, normal to base 6 (see e.g. FIG. 2). In the embodiment illustrated in FIGS. 1 to 4, wheel 14 is permitted to swivel 360° about a vertical axis by means of a swivel mechanism 18 which is secured to wheel support assembly 12 at the top and at the bottom to U-shaped wheel support member 20 on which wheel 14 is mounted for rotative movement on axle 22 passing therethrough. Wheel support assembly 12 is rigidly secured to flap 16.

Figure 2:
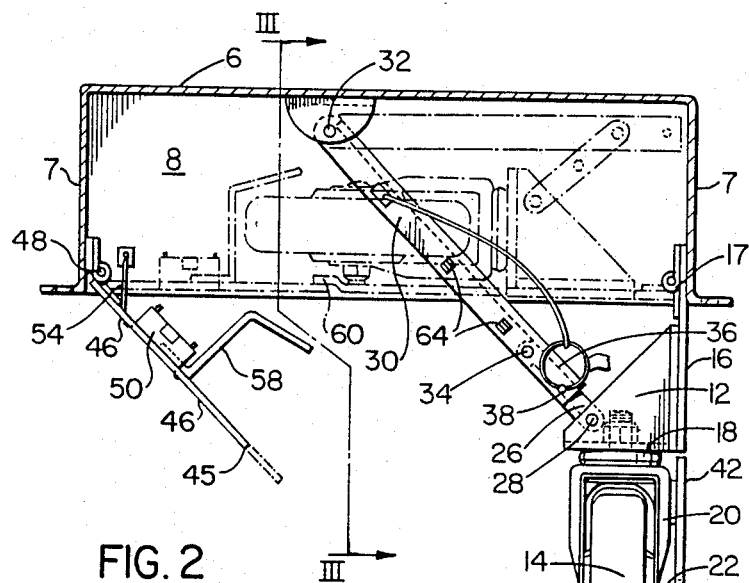
FIG. 2 is a section view along line II—II of FIG. 1.
Figure 3:
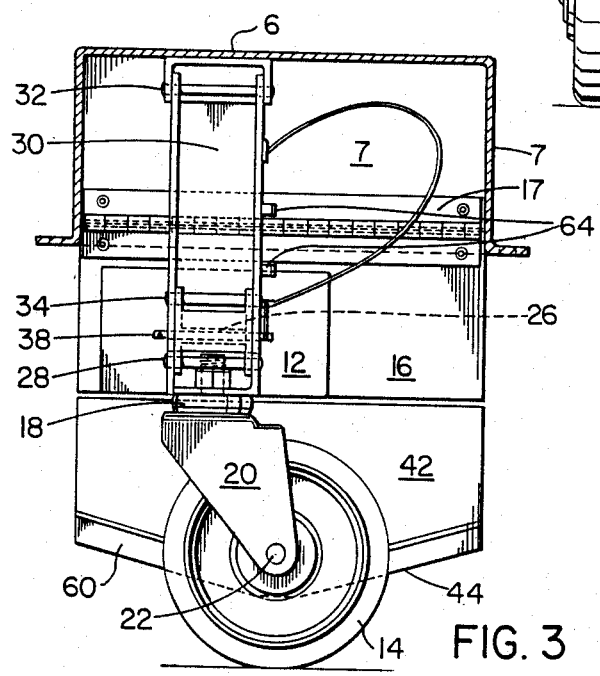
FIG. 3 is a section view along line III—III of FIG. 2.
Figure 6:
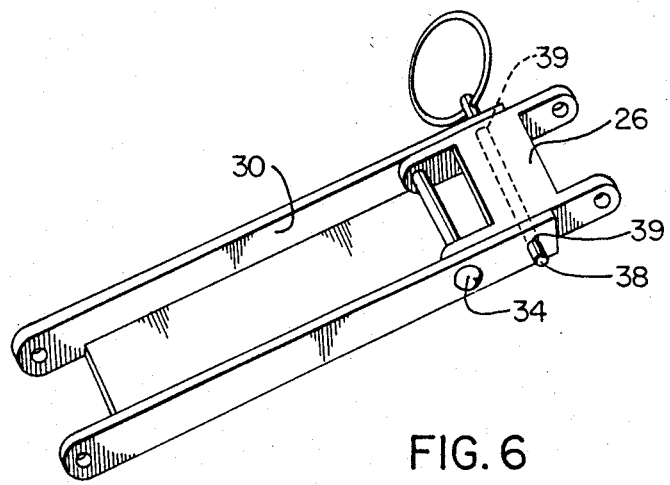
FIG. 6 is a detail view in perspective of the strut members of the casters of FIGS. 1 to 5. While the invention will be described in conjunction with example embodiments, it will be understood that it is not intended to limit the invention to such embodiments. On the contrary, it is intended to cover all alternatives, modifications and equivalents as may be included within the spirit and scope of the invention as defined by the appended claims.

Articulated strut means 10 comprises a lower strut member 26 secured to wheel support assembly 12 at pivot 28 and an upper strut member 30 which itself is pivotally secured at pivot 32 to base 6 of frame 4. These two strut members 26 and 30 are themselves pivotally secured to each other at pivot 34, portion 36 of upper strut member 30 overlapping a corresponding portion of lower strut member 26 to act as a stop and prevent further relative rotation of the two strut members once they are in aligned, operative position, as shown in FIG. 2. The two strut members 26 and 30 each have a transverse cross-sectional shape of a widened "U", with a face and upstanding sides normal thereto (FIG. 6). This permits the locking of the strut members in aligned, operational position, as illustrated in FIG. 2 by means of a locking pin 38 passing through aligned holes 39 (FIG. 6). A wire 40 may be used to attach locking pin 38 to frame 4. When wheel 14 is in retracted position, strut members 26 and 30 pivot relative to each other and to frame 4 and wheel support assembly 12 as illustrated in phantom in FIG. 2, so that the wheel 14, wheel support assembly 12, articulated strut means 10 are all completely withdrawn into cavity 8.

In the embodiment of the caster illustrated in FIGS. 1 to 4, in which wheel 14 is free to pivot about a vertical axis, a secondary flap 42 is secured to U-shaped wheel support 20 as illustrated. This secondary flap is permitted to unobstructedly pivot in association with wheel 14 about the vertical axis of rotation of swivel mechanism 18 and yet, when the wheel is in retracted position (FIG. 4), it assists in closing cavity 8.

Figure 5:
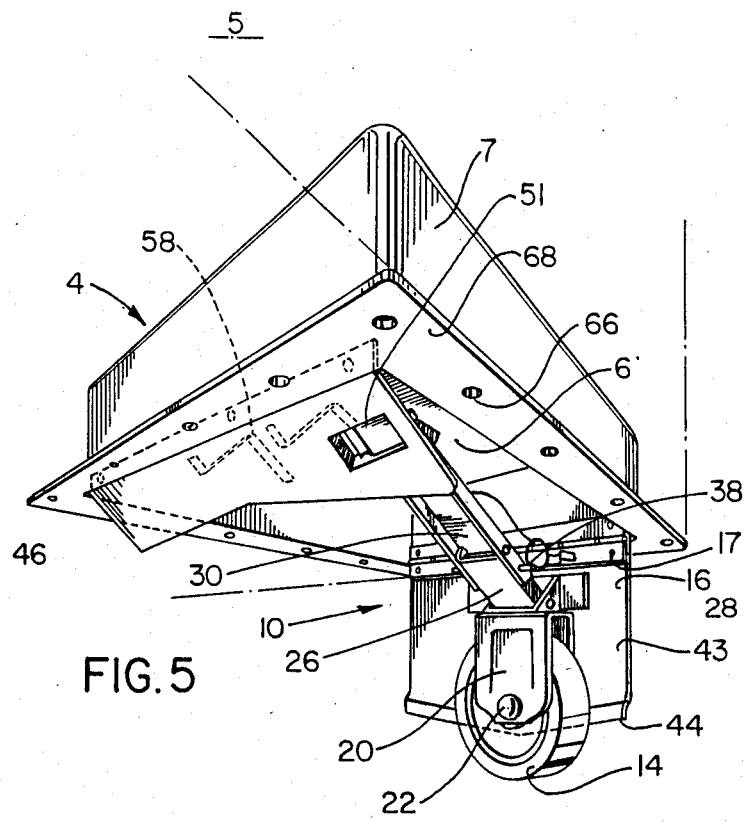
FIG. 5 is a perspective view from the bottom of an alternative preferred embodiment of caster in accordance with the present invention.

In FIG. 5 there is illustrated an alternative embodiment of retractable caster in accordance with the present invention, in which wheel 14 is not free to pivot. In this case, flaps 16 and 42 are replaced by a single flap 43 secured to U-shaped wheel support 20. As well, wheel support 20 and strut member 10 are more centered within cavity 8.

Figure 4:
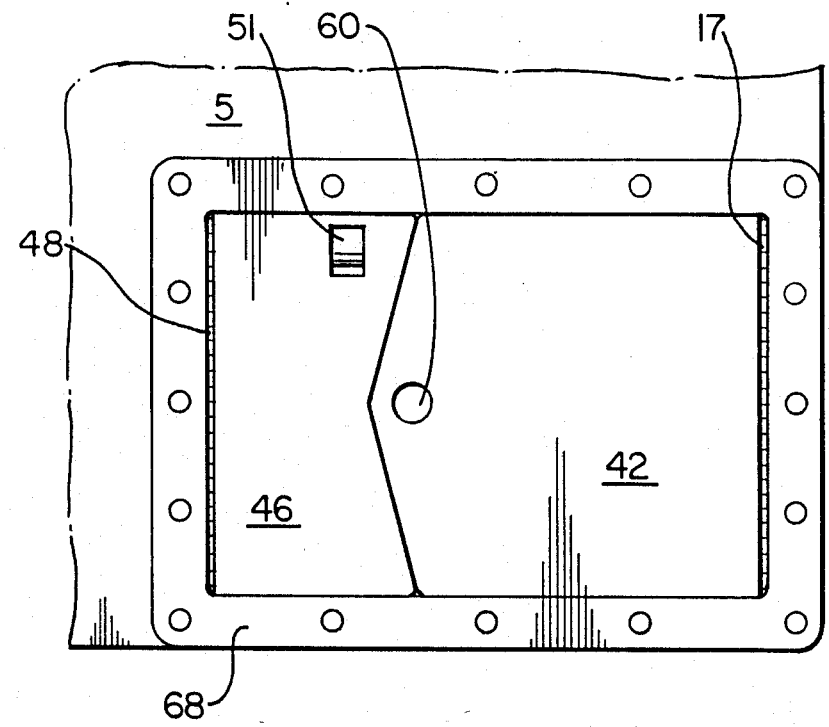
FIG. 4 is a bottom plan view of the caster of FIG. 1 with the wheel in retracted position.

In the embodiment of FIGS. 1 to 4 and that of FIG. 5, the lower edge 44 of secondary flap 42 (FIGS. 1 to 4) or flap 43 (FIG. 5) is such that the wheel 14 extends below it when in vertical, operative position. As well, this lower edge 44 is contoured to mate with lower edge 45 of flap 46 which is secured to the bottom edge of opposite side 7 from that to which flap 16 or 43 is secured. Flap 46 is secured to this opposite side 7 by means of a hinge 48. A lock mechanism 50 is secured to the inner surface of flap 46, an opening 51 being provided in flap 46 as illustrated in FIG. 4 to permit manipulation of lock 50. Lock 50 is provided with a latch mechanism 52 cooperating with a portion of a corresponding side 7 to releasably maintain flap 46 in closed position (phantom, FIG. 2), flap 46 cooperating when in this closed position with flaps 16 and 42 (FIGS. 1 to 4) or flap 43 (FIG. 5) to close cavity 8 when the caster wheel 14 is in retracted position. A wire 54 is secured to frame 4 and to flap 46 to prevent the flap from opening beyond the position illustrated in FIG. 2. In this position, wheel receiving fingers 58 which are secured to the interior surface of flap 46 receive wheel 14 as it is being retracted into cavity 8, and then cause flap 46 to move to closed position with flap 16/42 or flap 43. Lower edge 44 of flap 42 (FIGS. 1 to 4) or of flap 43 (FIG. 5) is provided with a slight indentation as illustrated so that lower edge 45 of flap 46 will support it, when in closed position as illustrated, with flap 46 then being generally flush with flaps 16/42 or flap 43.

When not in use, locking pin 38 for strut members 26 and 30 may be held in spring clips 64 (FIG. 2) mounted on the side, for example, of strut member 30.

The components for manufacturing retractable casters in accordance with the present invention may be selected dependent upon the intended use or uses for the casters. Any heavy duty caster, for example, may be used together with for example mild steel or stainless steel hinges, paddle handle recessed latch 50, and steel strut members 26 and 30. Steel frame 4 and flaps 16/42 or 43 may be used, for example. Pre-drilled holes 66 may be provided in flange 68 about the lower edge of sides 7 for mounting, in a recessed fashion, the caster of FIGS. 1 to 6.

In operation, the retractable caster 2 in accordance with the present invention is simply and quickly deployed and retracted. It may be flush or externally mounted, and straight or swivel acting as required. The frame 4 holding the retractable caster wheel 14 is, in the illustrated embodiment, flush mounted in the corner of a container 5 preferably with two straight and another swivel caster. In some instances, more than four casters may be necessary, depending upon the length of the container to be equipped. Exact placement may correspond to that for bolt-on or welded-on casters.

Once installed, to deploy the caster 2, flush lock 50 mounted on flap 46 is pulled, thereby freeing flap 46 to open. With the help of gravity, flap 46 and then flaps 16/42 (FIGS. 1 to 4) or flap 43 (FIG. 5) together with wheel 14 and strut assembly 10 drop into open, operative position. Locking pin 38 is then passed into aligned holes 39 to secure strut members 26 and 30 in aligned, operative position. The caster 2 is then ready for use.

To retract caster 2, pin 38 is pulled from aligned holes 39. Articulated strut assembly 10 and associated wheel support assembly 12 and wheel 14, together with its associated flaps, are then free to fold up into closed position simply by pushing wheel 14 and flaps 16/42 (FIGS. 1 to 4) or flap 43 (FIG. 5) up into closed position at the opening of cavity 8. The caster wheel 14 itself picks up and draws into closed position flap 46 by means of fingers 58. When pushed up flush, in closed position, lock 50 then locks flaps 46 and 16/42 or 43 into place in closed position. In the embodiment of FIGS. 1 to 4, where secondary flap 42 is free to swivel with respect to flap 16, the wheel and flap 42 must be appropriately aligned with respect to flap 16 as the wheel is retracted, so that the wheel will pick up fingers 58.

As can be seen in FIG. 2, a hole 60 may be provided in secondary flap 42 to provide access to nut 62 holding wheel 14 on axle 22, for example to replace wheel 14 if worn or damaged.

The retractable caster assembly in accordance with the present invention, it will be understood, will have many and varied uses in cargo and freight handling for airplanes, trucks and boats. Warehousing, grocery stores, courier services, contractors and manufacturing businesses, and the military, where large, bulky and/or heavy freight containers are handled, will find practical uses for casters in accordance with the present invention.

Thus it is apparent that there has been provided in accordance with the invention a retractable caster assembly that fully satisfies the objects, aims and advantages set forth above. While the invention has been described in conjunction with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the invention.

What I claim as my invention:

1. A retractable caster comprising:

(a) a frame having a planar base and sides circumscribing the base to form a cavity having an opening, the frame to be secured to the bottom of an object;
   (b) a first rigid flap secured to the frame by a hinge to swing about an axis between an open position perpendicular to the base and a closed position parallel to but spaced from the base to close at least a portion of the opening to the cavity;
   (c) a wheel rotatably supported by a wheel support assembly secured to the flap, a portion of the wheel extending beyond the lower edge of the flap when in open position;
   (d) an articulated strut secured to and extending between a portion of the frame and the wheel support assembly, the strut folding when the wheel is in retracted position so that the wheel, wheel support means and strut are fitted within the cavity between the base and the flap in closed position;
   (e) a lock means associated with the strut for releasably locking the strut in operable position, the strut when locked in operable position to rigidly support the wheel and flap in open position for load bearing purposes;
   (f) wherein the wheel support assembly comprises a wheel mount, the wheel being rotatably secured to the wheel mount for rotation about an axle secured to the wheel mount and passing through the wheel; and
   (g) wherein the wheel support assembly further comprises a swivel means secured to the flap and the wheel mount, and extending therebetween to permit the wheel to pivot about a vertical axis when the cover means is in open position.

2. A caster according to claim 1 wherein a supplementary flap is secured to the outside wheel mount to assist in closing the cavity when the wheel is in retracted position, the supplementary flap to unobstructably pivot with the wheel about the vertical axis when the wheel is in open, operational position.

3. A caster according to claim 2 wherein the axle of the wheel, when the wheel is in open operative position, is horizontally offset behind the vertical axis of the swivel means to facilitate castering of the wheel.

4. A retractable caster comprising:

(a) a frame having a planar base and sides circumscribing the base to form a cavity having an opening, the frame to be secured to the bottom of an object;
   (b) a first rigid flap secured to the frame by a hinge to swing about an axis between an open position perpendicular to the base and a closed position parallel to but spaced from the base to close at least a portion of the opening to the cavity;
   (c) a wheel rotatably supported by a wheel support assembly secured to the flap, a portion of the wheel extending beyond the lower edge of the flap when in open position;
   (d) an articulated strut secured to and extending between a portion of the frame and the wheel support assembly, the strut folding when the wheel is in retracted position so that the wheel, wheel support means and strut are fitted within the cavity between the base and the flap in closed position;
   (e) a lock means associated with the strut for releasably locking the strut in operable position, the strut when locked in operable position to rigidly support the wheel and flap in open position for load bearing purposes; and (f) wherein the articulated strut means comprises a pair of rigid, elongated strut members having a transverse cross-sectional shape comprising a wide base with upstanding sides normal thereto, one member pivotally attached to the other about an axis, corresponding ends of the members overlapping when in operational position.

5. A caster according to claim 4 wherein the articulated strut members are provided with aligned holes in the upstanding sides of overlapping portions of the members when in operational position, and wherein the lock means comprises a pin removably insertable in the aligned holes to secure the strut members in operational position.

6. A retractable caster comprising:
(a) a frame having a planar base and sides circumscribing the base to form a cavity having an opening, the frame to be secured to the bottom of an object;
(b) a first rigid flap secured to the frame by a hinge to swing about an axis between an open position perpendicular to the base and a closed position parallel to but spaced from the base to close at least a portion of the opening to the cavity;
(c) a wheel rotatably supported by a wheel support assembly secured to the flap, a portion of the wheel extending beyond the lower edge of the flap when in open position;
(d) an articulated strut secured to and extending between a portion of the frame and the wheel support assembly, the strut folding when the wheel is in retracted position so that the wheel, wheel support means and strut are fitted within the cavity between the base and the flap in closed position;
(e) a lock means associated with the strut for releasably locking the strut in operable position, the strut when locked in operable position to rigidly support the wheel and flap in open position for load bearing purposes;
(f) a second rigid flap secured to the frame by a hinge at a location opposite to the first flap to swing about an axis parallel to the axis of the first flap and spaced a similar distance from the base, the second flap to swing in a direction opposite to that in which the first flap swings, respectively between open and closed positions, confronting edges of the first and second flap when in closed position meeting to close the opening to the cavity; and
(g) wherein the second flap is provided, on its interior, surface with wheel receiving means operable to receive the wheel when it is being retracted and draw the second flap into closed position when the wheel is fully retracted and the first flap is in closed position.

7. A caster according to claim 6 wherein the outer edge of the first flap, remote from its hinge, underlies the outer edge of the second flap remote from its hinge, when the flaps are in closed position, to thereby enclose the cavity.

8. A caster according to claim 7 wherein releasable lock means are provided on the interior of the second flap, manipulable externally, for releasably securing the second flap in closed position with respect to the frame.

9. A retractable caster comprising:
(a) a frame having a planar base and sides circumscribing the base to form a cavity having an opening, the frame to be secured to the bottom of an object;
(b) a first rigid flap secured to the frame by a hinge to swing about an axis between an open position perpendicular to the base and a closed position parallel to but spaced from the base to close at least a portion of the opening to the cavity;
(c) a wheel rotatably supported by a wheel support assembly secured to the flap, a portion of the wheel extending beyond the lower edge of the flap when in open position;
(d) an articulated strut secured to and extending between a portion of the frame and the wheel support assembly, the strut folding when the wheel is in retracted position so that the wheel, wheel support means and strut are fitted within the cavity between the base and the flap in closed position;
(e) a lock means associated with the strut for releasably locking the strut in operable position, the strut when locked in operable position to rigidly support the wheel and flap in open position for load bearing purposes;
(f) wherein the wheel support assembly comprises a wheel mount, the wheel being rotatably secured to the wheel mount for rotation about an axle secured to the wheel mount and passing through the wheel;
(g) wherein the wheel mount is rigidly secured to the flap so that the wheel cannot turn relative to the frame about a vertical axle;
(h) a second rigid flap secured to the frame by a hinge means at a location opposite to the first flap to swing about an axis parallel to the axis of the first flap and spaced a similar distance from the base, the second flap to swing in a direction opposite to that in which the first flap swings, respectively between open and closed positions, confronting edges of the first and second flap when in closed position meeting to close the opening to the cavity; and
(i) wherein the second flap is provided, on its interior surface, with wheel receiving means operable to receive the wheel when it is being retracted and draw the second flap into closed position when the wheel is fully retracted and the first flap is in closed position.

10. A caster according to claim 9 wherein the outer edge of the first flap, remote from its hinge, underlies the outer edge of the second flap remote from its hinge, when the flaps are in closed position, to thereby enclose the cavity.

11. A caster according to claim 10 wherein releasable lock means are provided on the interior of the second flap, manipulable externally, for releasably securing the second flap in closed position with respect to the frame.

* * * * *